United States Patent [19]

Binder

[11] 4,337,406
[45] Jun. 29, 1982

[54] BEARING-LESS REMOTELY JOURNALLED DYNAMO ELECTRIC MACHINE, PARTICULARLY ALTERNATOR FOR COMBINATION WITH A GAS TURBINE

[75] Inventor: Georg Binder, Bechhofen, Fed. Rep. of Germany

[73] Assignee: Robert Bosch GmbH, Stuttgart, Fed. Rep. of Germany

[21] Appl. No.: 37,504

[22] Filed: May 10, 1979

[30] Foreign Application Priority Data

May 27, 1978 [DE] Fed. Rep. of Germany ....... 2823256

[51] Int. Cl.³ .............................................. H02K 5/00
[52] U.S. Cl. ........................................ 310/91; 310/62; 310/89; 310/112; 310/266; 403/260; 403/287
[58] Field of Search ..................... 310/91, 89, 90, 266, 310/171, 112, 113, 263, 68 D, 62, 63, 42; 312/13; 403/258, 260, 287; 290/1 R, 1 A

[56] References Cited

U.S. PATENT DOCUMENTS

| | | | |
|---|---|---|---|
| 2,987,637 | 6/1961 | Bertsche | 310/266 |
| 3,150,278 | 9/1964 | Clark | 310/89 |
| 3,215,878 | 11/1965 | Woodward | 310/266 |

FOREIGN PATENT DOCUMENTS

| | | | |
|---|---|---|---|
| 1048438 | 8/1951 | France | 310/263 |
| 1545514 | 11/1968 | France | 310/266 |
| 460146 | 9/1968 | Switzerland | 310/263 |

*Primary Examiner*—R. Skudy
*Attorney, Agent, or Firm*—Frishauf, Holtz, Goodman & Woodward

[57] ABSTRACT

To reduce the axial length of the dynamo electric machine—remote rotating apparatus combination, in which the remote rotating apparatus, typically, is a gas turbine, the operating shaft of the remote apparatus is formed with a conical recess, and a claw-type rotor, rotating between a fixed field structure and a fixed armature structure is formed with a hub having a conical projection fitting into the conical recess and no other bearing. The shaft, thus, can be terminated flush with the remote apparatus housing structure, which can be formed with additional locating elements, such as a flange, accurately concentric with the center of the shaft for positioning of the dynamo electric machine against the remote apparatus in accurately aligned position.

8 Claims, 3 Drawing Figures

BEARING-LESS REMOTELY JOURNALLED DYNAMO ELECTRIC MACHINE, PARTICULARLY ALTERNATOR FOR COMBINATION WITH A GAS TURBINE

CROSS REFERENCE TO RELATED APPLICATIONS

U.S. Ser. No. 22,283, filed Mar. 20, 1979, BINDER now U.S. Pat. No. 4,286,187; U.S. Ser. No. 20,237, filed Mar. 13, 1979, KREUZER now U.S. Pat. No. 4,228,377, both assigned to the assignee of the present application.

The present invention relates to a dynamo electric machine structure, and more particularly to an alternator structure which is remotely journalled and which is adapted for combination with an assembly to a prime mover which not only supplied rotary energy to the dynamo electric machine, or derives energy therefrom, but additionally provides the bearing for the rotor structure thereof.

Background and Prior Art

Various types of remotely journalled dynamo electric machines have been proposed. Such machines, typically alternators of various types, can be used to supply on-board networks of vehicles, ships, railroad equipment, aircraft, and the like; they are frequently combined with prime movers of an internal combustion or turbine type. Such machines usually have an outer stationary component, which includes the stator portion of the electrical structure. The stator usually is a three-phase armature. The machine also includes a rotor which, upon rotation, causes induction of the voltage in the armature winding which, for use of an on-board vehicular network, is usually rectified in a rectifier network which includes power rectifier diodes.

The rotor structure of such machines may include a rotor which has salient or flush poles, which are energized by a field winding. Another type of structure which is particularly suitable for vehicular or other mobile application utilizes a stationary field, a stationary armature, and an interdigited or claw pole rotor which rotates between the stationary field and the stationary armature to provide change in flux upon its rotation. This rotor element is not electrically connected to a winding, and such a claw pole alternator has the advantage that it does not require any slip rings, commutators, brushes, and the like. The flux guide element formed by the claw pole rotor is located between the stationary inner field structure, typically an electromagnet wound with a field coil to permit control of the output voltage. This electromagnet forms the core which is surrounded by the armature winding, with the claw pole rotor interposed. Since the field structure is stationary, washers and slip rings are eliminated. It has been customary to make such claw pole rotors of two half-pole elements which have a desired number of interdigited claws forming pole shoes or flux guide elements. The claws extending from opposite sides—with respect to the axis of the machine—are interdigited. A typical number of such claws is, for example, six. The fingers of the claw poles, forming the actual flux guide elements, are connected together and secured to a hub by a ring made of non-magnetic steel. The claw poles and the hub portion form an essentially cup-shaped element in which the hub portion forms the bottom of the cup. The shaft which rotates the claw pole structure is secured to this hub portion. In customary construction, two bearings are provided in the shell or end bells the alternator structure which then journal the hub portions of the claw pole rotor.

Structures of this type in which bearings are to be eliminated have the disadvantage that a coupling element must be provided to couple the remote power source, typically a gas turbine, to the hub or shaft of the dynamo electric machine. It is frequently desired to reduce the overall length of the dynamo electric machine coupled to the prime mover so that, to effect the coupling of the dynamo electric machine to the prime mover, it is necessary to provide a rotating core in which an outer projecting cone of the drive shaft can be introduced in order to permit transmission of rotary energy between the dynamo electric machine and the remote rotating apparatus. Remotely journalled dynamo electric machines can be constructed in slipring-less arrangements which, however, will result in three air gaps; or with slip rings in which only a single air gap is necessary.

The Invention

It is an object to so construct a remotely journalled dynamo electric machine, typically an alternator, for combination with, and assembly to a remote rotating apparatus which can be constructed in a compact manner, has a minimum number of air gaps and can easily be centered with respect to the center of rotation of the shaft of the remote rotating apparatus.

Briefly, the end portion of the shaft of the remote rotating apparatus is formed with a conical recess; the hub portion of the rotor of the dynamo electric machine has a conical projection extending therefrom, with the cone angles of the projection of the dynamo electric machine and of the recess in the shaft matching each other. The machine itself is connected to the apparatus in any suitable manner, for example by screws or the like, and the stator portion of the machine, including its housing shell, can easily be centered with respect to the center of rotation of the shaft by locating elements, such as a locating ring or locating ring portion, which can be accurately machined at the same time that the opening through which the shaft of the remote rotating apparatus extends is machined, the opening also retaining the bearing for the rotating shaft of the apparatus. Concentricity of the shell of the dynamo electric machine and of the rotor therein, coupled to the shaft, is thereby ensured, without extending the axial length of the overall structure formed by the rotating apparatus and the dynamo electric machine, attached thereto.

The shaft of the rotating apparatus and the projecting cone from the dynamo electric machine can be connected together by a central axially extending bolt or screw which can be passed either from the apparatus shaft side into the projection on the hub of the dynamo electric machine, or from the projection into a tapped opening extending beyond the conical recess within the end portion of the shaft of the remote apparatus. If it is desired to remove the dynamo electric machine, a simple press-off screw can be threaded into a suitable threaded opening of the hub of the dynamo electric machine, to bear against the inner portion of the tapped bore of the shaft of the remote apparatus, and thus permit press-off and disengagement of the conical projection from the shaft.

The dynamo electric machine can readily be constructed to have only two air gaps and still use the claw pole construction, that is, a stationary field and a stationary armature. This permits a structure which does not have slip rings or brushes, so that the resulting dynamo electric machine, effectively, is free from all maintenance since it does not have any bearings or any other engaged relatively rotating parts. Installation and assembly is simplified with respect to structures which have three air gaps and a rotating core.

The machine, when constructed as a three-phase alternator, is particularly suitable as an electrical generator for combination with gas turbines. It permits assembly with a gas turbine at a position where no element or component of the turbine extends therebeyond. The shaft of the turbine, therefore, need not be longer than the turbine structure itself but need only have the requisite length to be capable of being retained in the turbine end bearing and to pass through a seal to prevent contamination of the bearing by dust, dirt, or the like.

Drawings, illustrating preferred examples, wherein.

Basically, the present invention is related to a remotely journalled dynamo electric machine, typically an alternator, having a fixed, stationary core, and which is so constructed that, although the alternator does not have slip rings and brushes, the region of coupling or connection thereof to the remote apparatus is so arranged that a minimum of axial length is required, specifically that the alternator is compact and can be closely fitted to the remote apparatus, the shaft of the remote apparatus terminating essentially flush with its housing structure and being formed without an extension which penetrates into the core region of the dynamo electric machine itself—a structure not possible if the central core of the dynamo electric machine is fixed and stationary.

Figure 1:
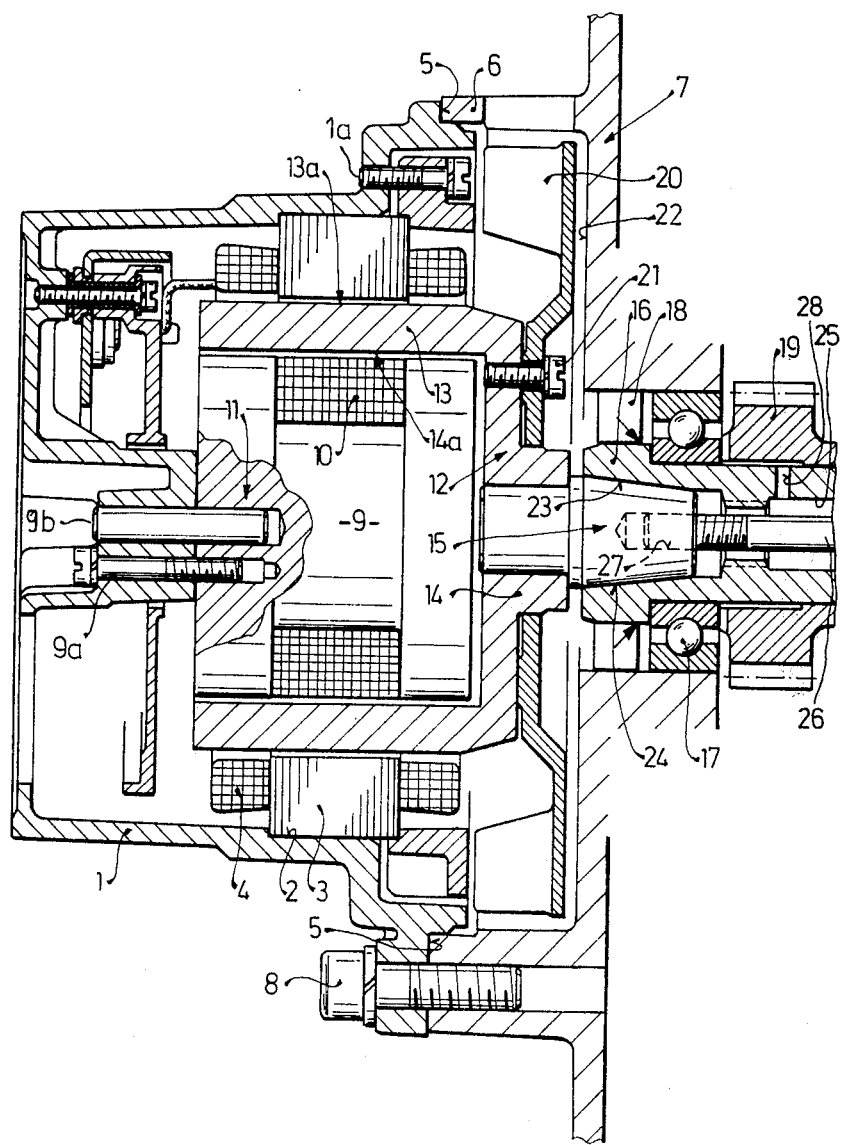
FIG. 1 is a highly schematic axial sectional view through an alternator secured to the end shaft of a gas turbine, in which elements and components not necessary for an understanding of the invention have been omitted, and illustrating attachment of the alternator rotor to the turbine shaft by an attachment screw extending from the side of the turbine shaft.

The alternator of FIG. 1 has an outer shell-type housing 1 which is fitted with various locating surfaces or notches, corners or rings. These surfaces or rings are, preferably, all circular, or located along a circular circumference, so that they can be machined in one set-up, thereby ensuring concentricity. A first groove or notch or corner 2 is provided to fit the armature sheet stack 3 therein. The armature sheet stack is wound with an armature winding 4. The assembly of the armature winding 3, 4 can be slipped into the groove or ring defined by the corner 2. The shell 1 is further formed with an outer ring 5 which fits against a projecting flange 6 formed on the end portion of the housing 7 of the remote apparatus, typically a gas turbine. Ring 5 and flange 6 form cooperating locating means. The flange 6 and the ring notch or groove 5—or circumferential portions thereof—form matching engagement surfaces fitting against each other. The shell 1 is secured to the housing portion 7 of the remote apparatus in any suitable manner, for example by screws 8, only one of which is shown, and which may be located circumferentially around the shell, for example 120° apart. The alternator has a stationary core inner portion formed by a core 9 in which the stationary field winding 10 is located. The stationary core is secured to the shell 1 in suitable manner, for example by screw 9a, and centered with respect to the shell 1 by a centering pin 9b, or by other suitable centering means. Other arrangements to secure the core 9 to the shell can be used, preferably including elements or locating surfaces or positioning recesses and projections which may be unitary with the shell 1 and/or the core 9.

Rotor 12 is formed as a flux conducting or flux gate rotor. It has a generally cylindrical region 13, longitudinally slotted, to change the flux passing from core 9 to the armature core laminations 3 as the rotor 12 rotates. The region 13 is located between the field winding 10 and the armature core laminations 3 around which the windings 4 are placed, so that, upon rotation of the rotor, a voltage is induced in the armature winding 4. Two air gaps will be present between the armature 3, 4 and the exciting field or core 9, namely the air gap 13a between the armature and the rotor portion 13, and the air gap 14a between the rotor portion 13 and the core structure 9.

The rotor 12 does not have bearings within the dynamo electric machine itself; rather, it is supported by the bearings of the remote apparatus and specifically by the shaft 16 thereof. The rotor 12 has a hub portion 14 and includes a coupling portion 15 with which the rotor 12 is secured to the shaft 16 of the remote apparatus. The arrangement is so made that the rotor is held exactly concentrically with respect to the remaining portions of the dynamo electric machine, and centered with respect to the axis of rotation of shaft 16 of the remote apparatus with which, also, the shell 1, and hence the stationary components, are centered. The shaft 16 of the remote apparatus, of course, is accurately concentric with respect to the ring flange 6 formed on the housing 7 of the remote apparatus. The shaft 16 is journalled in a bearing 17 which is placed as close to the outer portion of the apparatus as possible; this places the bearing 16 as close to the rotor 12 as possible. A sealing ring 18 is provided which prevents contamination of the bearing 17 by dirt, dust, and the like, and is located between the bearing 17 and the dynamo electric machine. The shaft 16 is formed with a gear 19 interiorly of the apparatus over which the shaft 16 can be driven. A fan or ventilator blade 20 is secured to the hub portion 14 of the rotor 12 by means of screws 21, or any other suitable attachment.

The structure can be constructed with minimum axial extent, with its rotor remotely journalled at only the axial end secured to the shaft 16—see FIG. 1, and without any increase in the axial length of the remote structure, and specifically without any axial extension or increase in size towards the remote apparatus. It can be directly positioned on the end wall 7, and the coupling arrangement between the rotor 12 and the shaft 16 is moved into the regin within the shaft 16 itself. This permits terminating the shaft 16 flush with the wall 7 of the remote apparatus, or projecting only very slightly therefrom and even recessed therefrom. The shaft 16 is formed with an inwardly extending conical recess 23 in which a cone 24 is fitted, projecting from the hub portion 14 of the rotor 12. The projecting cone 24, fitting into the matching conical recess, ensures accurate centered seating of the rotor 12 and supporting the rotor in cantilever position; the conical connection is positioned within the region of the shaft 16 itself, and located within the outline of the remote apparatus.

The projecting cone 24 is secured to the shaft 16 by a connecting screw 28 which is threaded into an interiorly threaded opening 27 within the conical projection. The screw 26 is accessible from the other end of the shaft 16, which has a hollow portion, the screw 26 passing through the central opening thereof. The central opening 25, preferably, is larger than the diameter of the screw 26; one or more transverse bores, of which one bore 28 is shown, is drilled radially from the circumference of the shaft 16 to meet the bore 25. Bore 25 and the radial opening, or openings 28 are used to provide lubricant to the bearing 17 and to other portions of the apparatus within the housing wall 7. The apparatus itself, for example, is the turbine shaft of a gas turbine, e.g. an exhaust gas turbine.

Figure 2A:
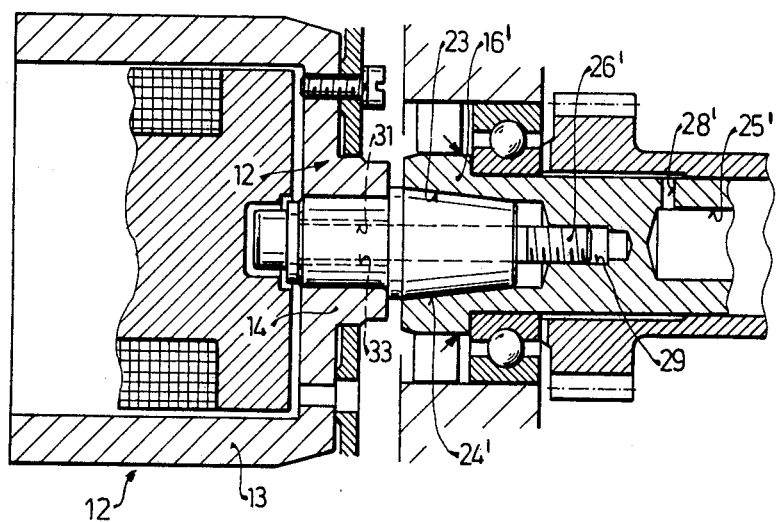
FIG. 2a is a fragmentary view, in axial section, of an attachment arrangement in which only the region of the connection of the shaft and alternator hub portion is shown, with the connection being made by an attachment screw extending from the alternator.
Figure 2B:
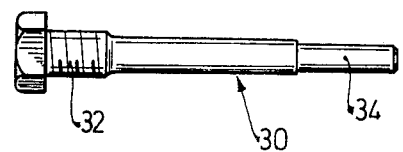
FIG. 2b is a pictorial view of a press-off screw tool for use in removing the alternator from the turbine after assembly thereto.

Various changes and modifications may be made, and the attachment of the projection 24 to the shaft 16 can be carried out in many different suitable ways. For example, and as illustrated in FIG. 2a, the projection 24 can be attached to the shaft 16 by a bolt or screw extending from the dynamo electric machine side. FIG. 2a shows only that portion of the dynamo machine—to a somewhat enlarged scale—which is material to an understanding of this embodiment. All parts which are similar have been given the same reference numerals and will not be described again. An attachment screw 26' extends through a bore in the projection 24', and is threaded into a suitably tapped bore 29 formed in the end portion of the shaft 16' of the remote apparatus. The bore 29 is blind bore, that is, it has a finite end within the shaft 16'. An oil supply duct 25' with radial connecting duct or ducts 28 terminates within the shaft 16' in advance of the end of the tapped hole 29. Preferably, the portion of the hub, or the extension 24 which lies within the hub portion 14, is internally threaded although the bolt 26' is smooth in this region. The internal thread in that portion is provided to permit ready disassembly of the rotor 13 from the shaft 16' of the remote apparatus by a press-off screw shown in FIG. 2b. To separate the rotor 12 from the shaft 16', i.e. to remove the rotor 12 and the conical projection 24 from recess 23 for example for repair or maintenance, and particularly after extended operating periods when the seat between the matching conical projection and recess has become "frozen", the bolt 26' is removed and, in its stead, the screw 30 shown in FIG. 2b is threaded into the opening. Screw 30 is threaded into the threaded portion 31 within the hub region of the projection 24', or of the hub itself. The threaded portion 32 of the press-off bolt 30, upon being threaded into the tapped section 31, will bear with its end portion 34 against the inner end of the blind bore 29, thus pressing the rotor 12 away from engagement with the shaft 16'. The end portion 34 of the press-off bolt 30 is of reduced diameter, slightly smaller than the inner diameter of the threaded portion of bolt 26' and smooth, as shown, so that, upon engagement of thread 32 and the portion 31 in the rotor 12, the rotor 12 will tend to be moved to the left upon rotation of the bolt 30.

Various other changes and modifications may be made, and features described in connection with any one of the embodiments may be used with any of the others, within the scope of the inventive concept. The dynamo electric machine itself can be assembled in any suitable manner to provide access to the head of bolt 26', for example, or screw 30 (FIG. 2b), for disassembly, by suitable location of the respective attachment screws 8 and internal connection screws, for example screw 1a, FIG. 1.

I claim:

1. Bearingless, remotely journalled dynamo electric machine for combination with and assembly to a remote rotating apparatus having a housing (7) and an operating shaft (16) journalled therein and passing through the housing, said machine having a shell (1), cooperating locating means (5, 6) formed on the shell and on the apparatus housing, respectively, to position the shell with respect to the housing and hence the shaft, the dynamo electric machine further having a stator structure including an armature (3, 4) mounted in the shell and a fixed field structure, said structures being positioned concentrically with respect to the shaft, and a rotor (12) within the shell including a rotating pole structure (13)

and wherein the rotor (12) comprises a single hub portion (14) secured to and supporting the rotor pole structure (13) and forming the sole support for said pole structure, said single hub portion being located at the side of the machine adjacent the rotating apparatus and including a conical projection (24) extending from the hub portion towards the shaft (16) of the apparatus;

a matching conical recess (23) formed in the shaft of the apparatus and receiving said conical projection to rotatably support the rotor by cantilever attachment, to form a driving connection between the shaft (16) of the remote apparatus and the rotor (12) and to centrically position said rotor with respect to the center of rotation of the shaft;

and means (26, 26') for securing said projection (24) and said shaft (16) together.

2. Machine according to claim 1, wherein said cooperating locating means comprise interfitting locating means (5, 6) formed on the shell (1) of the machine and on the housing (7) of the apparatus, respectively, and comprising circular portions concentric with the axis of rotation of said operating shaft (16) and having a diameter larger than the diameter of said shaft.

3. Machine according to claim 2, wherein the interfitting locating means includes a flange (6) projecting from the housing (7) of said apparatus;

and a fan or ventilator means (20) secured to the rotor (12) and positioned beneath said flange.

4. Machine according to claim 1, further comprising a bearing (17) located on said remote apparatus and journalling the operating shaft (16), said bearing being positioned within the housing in the region of the interengaging, matching conical projection extending from the rotor (12) and the conical recess (23) within the end portion of the operating shaft (16).

5. Machine according to claim 1, wherein the securing means (26) comprises an attachment bolt, said operating shaft (16) and said conical projection (24) being formed with axial bores in which said bolt is positioned.

6. Machine according to claim 5, wherein said bolt (26) is threaded into the axial bore formed in the conical projection (24).

7. Machine according to claim 5, wherein said attachment bolt (26') is threaded into the axial bore of the operating shaft (16).

8. Machine according to claim 7, wherein the axial bore within the operating shaft (16) is a blind bore extending axially beyond the conical recess;
.the bore in the conical projection has a portion (31) which is threaded;
and wherein, for removal of the rotor (12) and the conical projection (24) extending therefrom from the conical recess (23) in the operating shaft (16), a press-off bolt (30) is provided having a threaded portion fitting into the threaded portion of the conical projection and a tip end which is smooth and of a diameter smaller than the smallest clear diameter within the axial bore of the shaft (16), the length of said press-off bolt being longer than the length of the bores through the conical projection and the end portion of the operating shaft (16) to permit removal of the rotor (12) and the conical projection (24) extending therefrom from the matching recess (23) in the end portion of the shaft (16) upon engagement of the smooth end portion of said press-off bolt with the bottom of the axial bore formed in the shaft.

* * * * *